United States Patent [19]

Kobayashi et al.

[11] 4,385,531

[45] May 31, 1983

[54] HYDRAULIC CIRCUIT SYSTEM FOR AUTOMATIC TRANSMISSION

[75] Inventors: Kouzi Kobayashi, Toyota; Keizo Kobayashi, Anjo, both of Japan

[73] Assignee: Aisin-Warner Kabushiki Kaisha, Anjo, Japan

[21] Appl. No.: 180,429

[22] Filed: Aug. 22, 1980

[30] Foreign Application Priority Data

Aug. 30, 1979 [JP] Japan ................................. 54-111261

[51] Int. Cl.³ ........................ B60K 21/02; B60K 41/12
[52] U.S. Cl. ......................................... 74/869; 74/867; 74/752 C; 192/357
[58] Field of Search ............ 74/867, 868, 869, 752 C, 74/733; 192/113 A, 357

[56] References Cited

U.S. PATENT DOCUMENTS

| | | | |
|---|---|---|---|
| 3,043,161 | 7/1962 | Tuck ..................................... | 74/867 |
| 3,651,714 | 3/1972 | Ohya et al. .......................... | 74/867 |
| 3,683,721 | 8/1972 | Uozumi et al. ...................... | 74/868 |
| 3,895,547 | 7/1975 | Murakami ............................ | 74/867 |
| 3,949,627 | 4/1976 | Murakami ............................ | 74/867 |
| 4,008,630 | 2/1977 | Murakami et al. .................. | 74/869 |
| 4,030,381 | 6/1977 | Lalin et al. ........................... | 74/867 |
| 4,290,325 | 9/1981 | Nishimura ............................ | 74/867 |

*Primary Examiner*—Lawrence J. Staab
*Assistant Examiner*—Lawrence J. Gotts
*Attorney, Agent, or Firm*—Oblon, Fisher, Spivak, McClelland & Maier

[57] ABSTRACT

A hydraulic circuit system in the automatic transmission has a hydraulic line or passage through which a hydraulic fluid delivered from a hydraulic power source or a hydraulic fluid output provided by a regulator valve is directly supplied to a torque converter, so that the overheat that may otherwise occur in the hydraulic fluid within the torque converter during the low engine output can effectively be prevented.

2 Claims, 1 Drawing Figure

HYDRAULIC CIRCUIT SYSTEM FOR AUTOMATIC TRANSMISSION

BACKGROUND OF THE INVENTION

The present invention relates to a hydraulic circuit system which supplies a hydraulic pressure to the automatic transmission for vehicles.

SUMMARY OF THE INVENTION

It is a principal object of the present invention to provide a hydraulic circuit apparatus which provides a constant supply of a hydraulic pressure to a torque converter, thereby keeping the hydraulic fluid within the torque converter cool at all times during the engine output.

In the present invention, a hydraulic circuit system in the automatic transmission has a hydraulic line or passage through which a hydraulic fluid delivered from a hydraulic power source or a hydraulic fluid output provided by a regulator valve is directly supplied to a torque converter, so that the overheating that may otherwise occur in the hydraulic fluid within the torque converter during the low engine output can effectively be prevented.

A present invention provides a hydraulic circuit apparatus for an automatic transmission having a regulator valve means for regulating a line pressure from a hydraulic power source to a regulated output, a plurality of friction engaging elements including friction clutches and friction brakes operated by a planetary gear train and respective hydraulic power cylinders, and a hydraulic control means including a governor valve for providing a governor pressure depending on the vehicle speed, a throttle valve for providing a throttle pressure depending on the throttle position and shift valves for receiving the governor pressure and throttle pressure and switching the hydraulic lines between the hydraulic power cylinders and the hydraulic power source, the regulated output of the regulator valve being supplied to the hydraulic power cylinders for selectively operating the respective friction engaging elements to enable the gear shift means to automatically shift through its forward speed ranges and a reverse, and being supplied to the hydraulic control means, thereby providing an excess oil in the regulator valve to the lubrication required parts and torque converter in the automatic transmission, wherein the improvement comprises a hydraulic line for supplying a hydraulic fluid from the hydraulic power source directly to the torque converter.

BRIEF DESCRIPTION OF THE DRAWING

Other objects and features of the present invention will be better understood from the following description of the preferred embodiment shown in the accompanying drawing in which.

DESCRIPTION OF THE PREFERRED EMBODIMENTS

Figure 1:
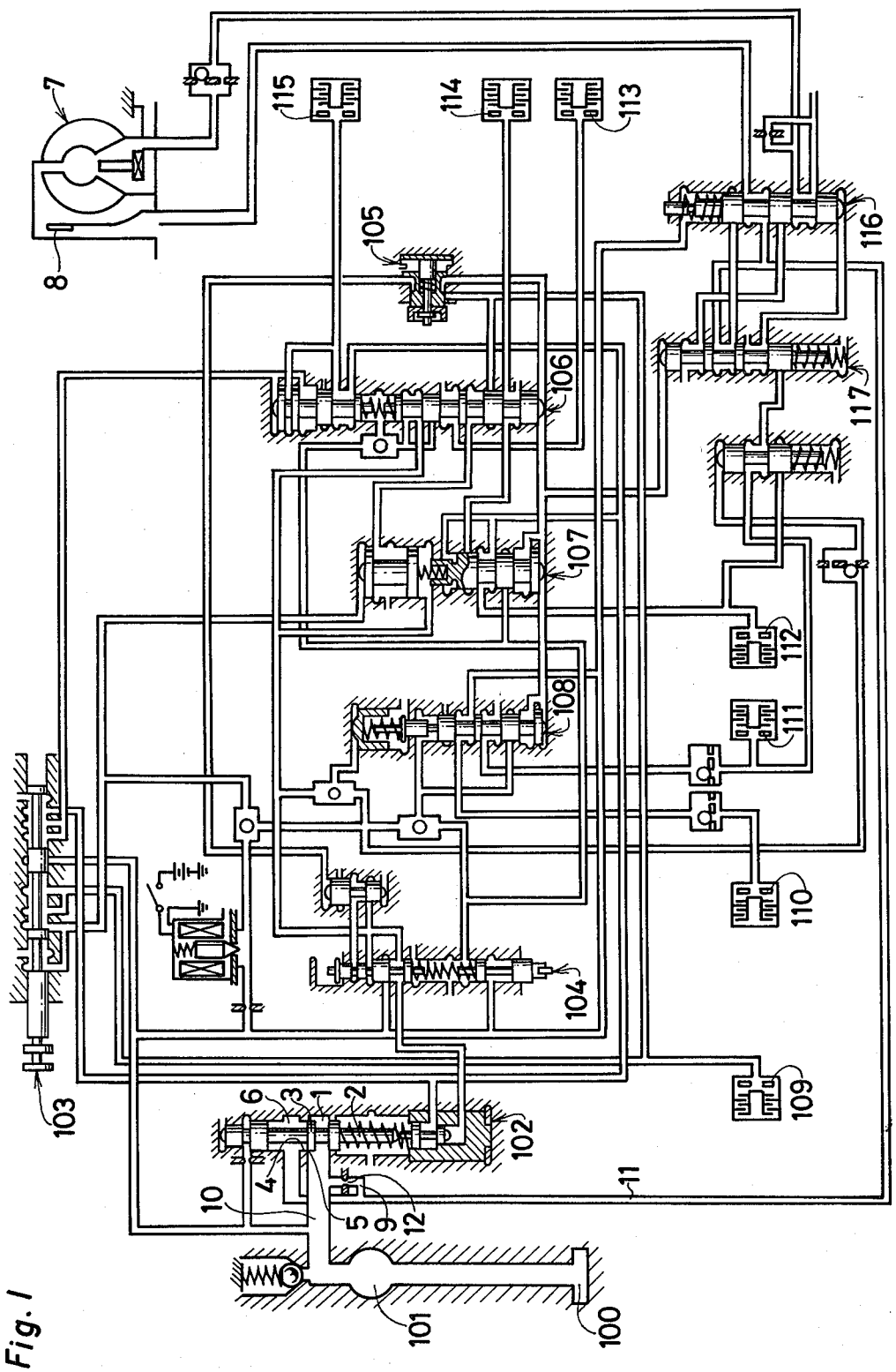
FIG. 1 is a hydraulic circuit diagram illustrating the arrangement of the hydraulic circuit apparatus according to a preferred embodiment of the present invention.

The hydraulic circuit apparatus provides hydraulic pressure to the fluidly-operated automatic transmission including the torque converter, gear shifter and hydraulic control apparatus, and is now described in detail. Referring to FIG. 1, a hydraulic fluid supplied from an oil tank 100 via a pump 101 is delivered to a regulator valve 102 which regulates the hydraulic pressure to a line pressure depending on the vehicle speeds and throttle positions. This regulated line pressure is supplied to the hydraulic control apparatus which comprises a manual valve 103, a throttle valve 104 which provides a throttle pressure depending on the throttle positions, a governor valve 105 which provides a governor pressure depending on the vehicle speed, and shift valves including 1-2 shift valve 106, 2-3 shift valve 107 and 3-4 shift valve 108 each of which receives the throttle pressure and governor pressure from the respective throttle and governor valves and is operated to switch the fluid flows in response to the input throttle and governor pressures which represent the vehicle speed and throttle positions, respectively. The line pressure is also supplied through the above shift valves or manual valve 103 to the hydraulic power cylinders 109-115 for the friction engaging elements such as friction clutches and friction brakes provided within the gear shifter (not shown). Thus, the gear shifter shifts through its complete forward speed ranges and reverse, depending on the vehicle speed and throttle position. The regulator valve 102 has a line-pressure regulating chamber 1, a spool 2 and a land 3. An excess oil leak from the chamber through a clearance 5 between the land 3 and the valve wall 4 varying in width with the movement of the spool 2 is collected into an oil chamber 6, from which the collected oil is supplied to the torque converter 7 and other parts or elements requiring lubrication within the automatic transmission.

A hydraulic by-pass passage 9 communicates a pressure supply line 10 with a hydraulic line 11. The pressure supply line 10 is connected to the line pressure regulating chamber 1 of the regulator valve 102 so that the pressure in the line 10 is regulated by the valve 102. An excess or redundant oil which has leaked through the gap 5 into the oil chamber 6 is introduced through a torque converter direct coupling clutch control valve 116 or lockup shift valve 117 into the torque converter 7 which is equipped with a direct coupling clutch 8 according to the shown embodiment of the invention. The by-pass passage 9 includes an orifice 12 therein which serves to regulate the flow of oil from the line pressure supply line 10 to the torque converter 7. The orifice 12 should be capable of supplying at least 1 or more of hydraulic fluid per minute to the torque converter 7 when the engine is idling with the lowest delivery pressure provided by the oil pump 101, and in the case of the automatic transmission for 2000 cc class vehicles, it should desirably be of such a size as to permit 1.5 to 2.0 l/min. of hydraulic fluid to flow therethrough when the engine is idling.

The frictional effect of the hydraulic fluid or oil within the torque converter 7 may produce heat, causing a rise in the temperature of the oil, and it is therefore necessary to continue a supply of a constant rate of cool oil from the outside, thereby keeping the oil within the torque converter cool. However, a rise in the temperature of the oil causes an increasing leak of oil to occur into the intergaps of the elements within the oil pump 101 (such as gaps between gear teeth addendums and lateral sides) and thus causes a lower pump output. The rising oil temperature also causes an increasing oil leak from the gaps between the various parts of the hydraulic control circuit and hydraulic power cylinders (such as clearances in each valve lateral side). Furthermore, as the delivery of the oil pump is lowered when the engine output is low or idling, the rise in the oil temperature causes a decrease in the excess oil supply to the hydraulic line 11 which results from the regulation of the line pressure being performed by the regulator valve 102. In accordance with the prior art hydraulic circuit apparatus, which circulates only this excess oil to the torque converter when the engine is revolving at low speed with the oil having a rise in temperature, it is difficult or almost impossible in some cases, to supply a sufficient amount of cool oil to keep the oil in the torque converter cool. Cooling the oil in the torque converter is particularly required when a low power transmission capacity torque converter is installed on a relatively weighty vehicle.

The hydraulic circuit apparatus according to the present invention provides not only an excess oil leak that is produced during the regulator valve 102 is actuated to regulate a line pressure which is produced during the engine output, but also a constant supply of cool oil from the orifice 12 equipped hydraulic line so that the torque converter 7 is kept supplied with a sufficient amount of oil to keep the oil in the torque converter 7 cool.

The hydraulic oil supplied through the orifice 12 to the torque converter may be given a delivery pressure provided by the oil pump 101, instead of the regulated line pressure provided by the regulator valve 102. The orifice 12 may be eliminated by properly choosing the cross-sectional area and length of the by-pass passage 9.

Although the present invention has been described with reference to the shown preferred embodiment thereof, it should be understood that various changes and modifications may be made without departing from the spirit and scope of the invention.

We claim:

1. A hydraulic circuit apparatus for an automatic transmission including a plurality of friction engaging elements and a planetary gear set, said hydraulic circuit apparatus including:
   a pressurized hydraulic fluid source;
   a regulator valve connected to said source via first fluid conduit means;
   hydraulic power cylinders connected to said friction engaging elements and in fluid communication with a regulated fluid output of said regulator valve via second fluid conduit means;
   hydraulic control means including a governor valve, a throttle valve and at least one shift valve, said hydraulic control means being in fluid communication with said regulated fluid output of said regulator valve via third fluid conduit means;
   fourth fluid conduit means connected between said regulator valve and said torque converter for providing fluid flow therebetween;
   valve means associated with said regulator valve for selectively supplying fluid from said regulator valve to said fourth fluid conduit means when said fluid source provides fluid pressure exceeding a predetermined value;
   fifth bypass fluid conduit means connected between said first and fourth fluid conduit means; and
   restriction means in said fifth bypass fluid conduit means, said restriction means being sized for permitting a predetermined fluid flow rate therethrough at a fluid pressure below said predetermined value.

2. The hydraulic circuit appparatus of claim 1 wherein said predetermined fluid flow rate is at least 1 liter per minute.

* * * * *